June 28, 1966 W. C. ANDERSON 3,258,604

VARIABLE MAGNETIC PULSE FORMING AND COUNTING DEVICE

Filed Oct. 21, 1960 2 Sheets-Sheet 1

INVENTOR.
WILMER C. ANDERSON
BY V. H. Hulse
ATTORNEY

June 28, 1966 W. C. ANDERSON 3,258,604

VARIABLE MAGNETIC PULSE FORMING AND COUNTING DEVICE

Filed Oct. 21, 1960 2 Sheets-Sheet 2

INVENTOR.
WILMER C. ANDERSON
BY [signature]
ATTORNEY

United States Patent Office 3,258,604

Patented June 28, 1966

3,258,604

VARIABLE MAGNETIC PULSE FORMING AND COUNTING DEVICE

Wilmer C. Anderson, Greenwich, Conn., assignor to General Time Corporation, New York, N.Y., a corporation of Delaware Filed Oct. 21, 1960, Ser. No. 64,110
17 Claims. (Cl. 307—88)

This invention relates to magnetic devices for forming and counting electrical pulses and more particularly to devices utilizing an independently variable magnetic field to control the response of such devices.

Apparatus which is identified by a great variety of names such as counters, pulse formers, sealers, frequency dividers, and the like (sometimes collectively called "counters" herein) controls or directs particular circuit functions responsive to the receipt of a given number of input signals. A device suitable for use in connection with such apparatus includes a saturable magnetic reactor having a substantially rectangular hysteresis loop core. These devices have inherent advantages since they rely upon the characteristics of core material which are very uniform and stable over a long lifetime. However, these devices also tend to have limited versatility because magnetic cores are driven into saturation responsive to the receipt of a number of pulses which is fixed by the number of turns in a saturating winding and by the energizing current that flows through such winding when such pulses are applied thereto. For example, a device which counts six pulses cannot be used without modification to count five pulses. In order to increase the versatility of these magnetic devices, it has been necessary to provide circuits which may selectively change or otherwise control the number of pulses that are required to drive the core into saturation. While many of these prior systems provide good results, most of them require complex circuitry of a type which is justified only in connection with fairly large and expensive installations.

Accordingly, it is an object of this invention to provide new and improved magnetic devices for forming and counting electrical pulses. In this connection, it is an object of this invention to provide simple and reliable means for selectively varying the pulse count of magnetic counters without requiring complicated and expensive electrical control circuits.

It is likewise an object to utilize an external magnetic field for variably adjusting magnetic counting or pulse forming devices. A more particular object of the invention is to utilize the reliably stable properties of permanent magnets to control the width of output pulses and to select the number of pulses in a count cycle. Still another particular object of this invention is to utilize the easily controlled magnetic field of an electro-magnet to vary the width of output pulses and to select the number of pulses in a count cycle.

Another object of this invention is to provide pulse forming and counting devices with increased flexibility and versatility especially for use in connection with small or inexpensive counters. In this respect, an object is to form output pulses having a variable volt-second content which may be selected with great accuracy. Another object is to provide counters having the ability to count any selected one of a number of input pulses.

Other objects and advantages of the invention will appear from the following description taken with the accompanying drawings in which:

FIGURE 1 is a perspective view which shows the physical structure of a preferred embodiment of the invention;

FIGS. 2*a* and 2*b* are a schematic top view of a structure incorporating this invention and illustrating the magnetic phenomena believed to be involved in the operation of the invention;

Figure 3:
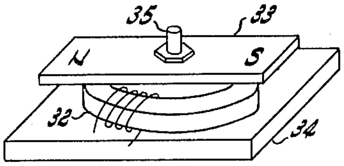
FIGURE 3 is a diagrammatic view in perspective which shows a second embodiment of the invention wherein a given saturable magnetic reactor bias is provided during manufacture.

While the invention is susceptible of various modifications and alternative constructions, there are shown in the drawings and will herein be described in detail certain preferred embodiments. It is to be understood that it is not thereby intended to limit the invention to the particular forms disclosed, but it is, on the other hand, intended to cover all modifications, equivalents, and alternative constructions falling within the spirit and scope of the invention as expressed in the appended claims.

The present invention is particularly described herein in connection with pulse formers and counters which depend upon the characteristics of rectangular hysteresis loop cores for an integration of the volt-second content of uniform drive pulses. For an example of the construction and operation of one of these devices, see United States Patent 2,897,380 granted to Carl Neitzert and assigned to the assignee of the present invention. Briefly, the flux density in such rectangular loop cores is driven step-by-step from a negative saturation or reset remanent level of magnetization, i.e., that remaining after the resetting magnetizing forces are removed, to and beyond a positive saturation level of magnetization responsive to the receipt of a given number of drive pulses each having a uniform volt-second content. Upon termination of the pulse that drives the core into saturation, the core flux decays and induces a voltage in a trigger winding to start a resetting current flow which drives the core flux from the positive saturation level to the negative saturation level. The resetting flux change produces an output pulse. The number of pulses (count cycle) required to so saturate the core is fixed by the relation between the physical structure of the pulse former or counter and the volt-second content of the drive pulses.

In the present invention, an external magnetic field is employed to adjust the count cycle or pulse forming parameters. The effect upon the closed core is unlike that obtained by a bias winding on the core and instead corresponds to an adjustment of the core cross section area. Four embodiments of the invention are described below to illustrate various ways of applying a controllable external flux field.

Figure 1:
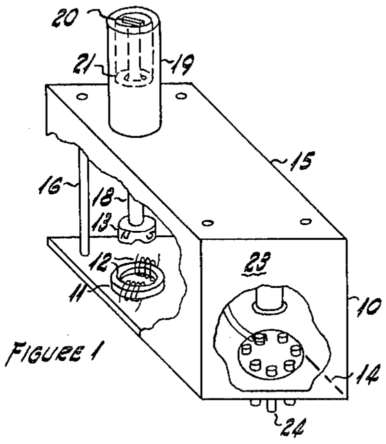

Referring generally to a first and preferred embodiment of FIG. 1, an assembly 10 is shown in which an annular counter core 11 having windings 12 thereon is stationed near a source of flux field, here shown as permanent magnet 13. The magnet is movable relative to the core to control the amount of the magnet flux which passes through the core. As shown, lower and upper supporting plates 14 and 15 are held in spaced parallel relation by spacer bars such as 16. Preferably, the plates and bars are made of non-magnetic materials. The counter core 11 is suitably mounted on the lower or base plate 14 and the permanent magnet 13 is positioned an adjustable distance above the core by a feed screw 18. The magnet is secured to one end of the feed screw. The other end of the feed screw extends through a threaded sleeve or nut 19 secured to the top plate 15. Thus, the feed screw may be turned to hold the magnet at any desired level.

To turn the screw and thus raise or lower the magnet, a slotted head 20 is provided on the upper end of the feed screw for making a screwdriver adjustment. Various more or less elaborate feed and retracting means may, of course, be substituted. While the lower limit of the magnet travel can be fixed by the core itself, a stop 21 suitably defined by the end of a counterbore in the upper portion of the sleeve 19 engages the screw head 20 to prevent the magnet from raking or scraping the core windings. Alternatively, the windings may be protected by a thin sheet of non-magnetic material interposed between the magnet and core, conveniently this sheet is plastic or fibre material which is also an electrical insulation. The upper limit of the magnet travel is suitably established by either the supporting plate 15 or a stop collar (not shown) fastened on the screw 18.

To prevent the interaction of stray magnet fields with core 11, the assembly of FIG. 1 is enclosed in a soft iron shielding shell or can 23 (shown partly broken away). Electrical connections can be conveniently made from the windings 12 on the core to circuit elements outside of the can 23 by means of a plug-connector 24 secured to the lower side of the base plate 14. Some or all of the related circuit elements may also be enclosed within the can as desired for particular equipments.

Referring more particularly to the structural relationships between the magnet 13 and the core 11, the maximum limits of magnet travel and the relative sizes of the core and magnet are selected so that flux from the magnet saturates the core or a portion of the core length when the magnet is at its lowermost position, and so that the magnet flux has virtually no effect on the core flux level when the magnet is at its uppermost position. If less than the maximum adjustable range of control is needed, the limits of magnet travel may be correspondingly narrowed.

Significantly, the core 11 of counters or pulse formers of the type previously referred to has an annular shape. Cores of this type are preferably made of spirally wound, grain-oriented magnetic material having a generally rectangular hysteresis loop in accordance with the well-known techniques. The core thus has a closed configuration since any gap defined between the spiral turns may be considered as of negligible effect in the unidirectional magnetization of the core. The cross sections of such cores are substantially uniform along their length. In counter or pulse forming devices of the type here referred to, the windings 12 are turned around the core to generate flux directed circularly around the closed core.

The flux circuit of the permanent magnet 13, on the other hand, is interrupted by air gaps between the respective N (north) and S (south) poles of the magnet adjacent portions of the core. In this instance the magnet is essentially cylindrical with one face slotted to define salient poles, but various other shapes such as bar magnets or horseshoe magnets may be alternatively employed. In the FIG. 1 apparatus a physically compact magnet suitably employs a high-energy, aluminum-nickel-cobalt iron magnet alloy identified as Alnico 5. Other common permanent magnet material may be substituted. As further shown in the FIG. 1 embodiment, the diameter of the core and the spacing of the magnet poles are approximately equal so that the pole pieces N and S face diametrically opposed portions of the angular core.

As the magnet rotates toward or away from the core, the two air gaps, one from each pole face to the nearest portion of the core 11, are thus varied in the magnetic circuit. A critically precise magnet mounting has not been observed to be necessary. Even if the magnet axis of rotation should be slightly askew, for example, the total air gap length (the sum of the two air gaps) varies at a substantially constant rate and the annular core is of uniform cross section so that the rotational alinement of the magnet above it has no observable effect on the control of saturation.

It will be appreciated that the change in the total air gap in the permanent magnet flux path as the magnet feed screw is turned changes the reluctance of the magnetic circuit. Since the magnetomotive force of the magnet is constant, the amount of flux passing from the magnet to the core is diminished as the air gap increases. For a more complete understanding of the manner in which this flux is utilized in a closed reactor core, reference is made to FIGS. 2*a* and 2*b*. Each of the figures shows a schematic top view of an annular core 26, a portion of the winding 27, and an outline of a bar magnet 28 having its respective N and S poles adjacent diametrically opposite portions of the core. The magnet length representation differs from that of FIG. 1 since the poles N and S of FIGS. 2*a* and 2*b* are shown within the opening of the annular core, both to illustrate a variation of the construction and also, in this instance, to facilitate illustration of the flux distribution.

It is believed that the flux path from the N to S poles is divided between opposite portions of the core 26 as shown by arrows **29*a* and 29*b***. It will be appreciated that the permeability of the core material is usually several thousand times that of air, and that the flux from the magnet follows the paths having the least reluctance. The opposite core length portions are thus in parallel in the magnetic circuit, these portions being identified (with the core shown in FIGS. 2*a* and 2*b*) as the upper and lower portions *a* and *b* respectively. When energized the winding 27, on the other hand, generates flux which extends circularly around the core in either a clockwise or counterclockwise direction. When the core is being driven toward saturation by input pulses applied to the winding turns, the flux generated thereby may, for example, be directed clockwise as indicated by the circular arrows **30*a*** in FIG. 2*a*. When the core is being reset or driven toward negative saturation, the generated flux is directed oppositely or counterclockwise, as indicated by the circular arrows **30*b*** in FIG. 2*b*.

Figure 2A:
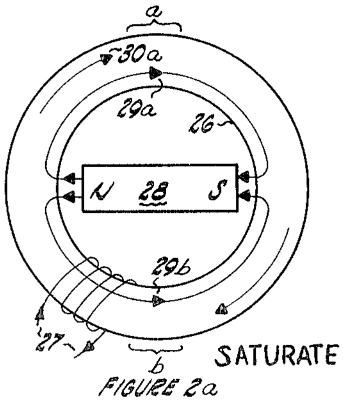

During saturation of the core by input or drive pulses, and as indicated in FIG. 2*a*, a portion of the magnet flux (arrow **29*a*) aids or boosts the flux generated by the winding (arrow 30*a***) in the upper segment *a* of the core. The exact length of the segment *a* is not important since the saturation of any length of the core produces the desired saturation effect whereby a continued energization of winding 27 thereafter causes very little additional flux change. It is, thus, not important that the flux lines (arrows **29*b*, 30*a***) oppose each other in the lower side of the core in segment *b* and the segment *b* may remain unsaturated. Thus as the air gaps are decreased, the volt-second content of the energizing current required to saturate the core is decreased to reduce the count cycle accordingly.

Figure 2B:
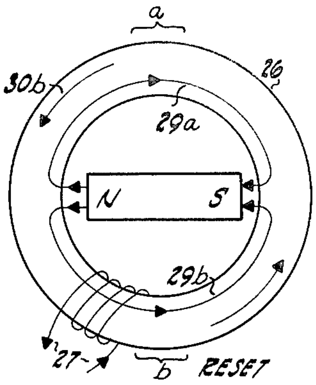

However, during reset of the core, and as shown in FIG. 2*b*, reversal of the direction of current flowing through the winding 27 or the energization of an oppositely wound reset winding generates flux in the direction shown by the arrow **30*b*. The magnet flux 29*b*** in the lower portion *b* of the annular core aids the flux generated by the winding so that segment *b* of the core is driven into saturation. The magnet flux direction does not have to be reversed since it exists at all times in different directions through different partial lengths of the closed core. As the air gap is decreased, the volt-second product required to saturate the core in the negative or reset direction is decreased. Accordingly, the output signal generated by the reset flux change is likewise adjustably decreased.

In the embodiment of FIG. 3, the reactor 32 is magnetically biased by semi-permanently incorporating a permanent magnet 33 having a field of predetermined flux density. As here shown both the saturable reactor 32 and the magnet 33 are fastened directly to the base plate 34 by any suitable means such as a nut and bolt 35. To adjust the count cycle or volt-second content of a formed pulse in this embodiment, the magnet 33 is replaced by a different magnet having a flux field of a different density.

Figure 4:
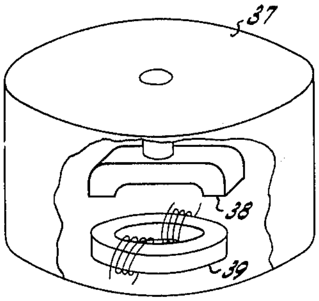
FIG. 4 is a diagrammatic view in perspective of a third embodiment of the invention having a permanent magnet coupled to the diaphragm of an instrument such as an aneroid barometer to provide an analogue to digital converter.

The embodiment that is shown in FIG. 4 provides an analog to digital converter. In greater detail, a diaphragm 37 or similar device is supported in association with any suitable instrumentation and arranged to move responsive to a variation of a condition such as acceleration, pressure, temperature, flow of a liquid, etc. For example, the diaphragm 37 may be part of an aneroid barometer. As the various forces act upon the diaphragm, a permanent magnet 38 connected thereto is moved toward or away from the core 39 to vary the level of magnetic bias in the core. Such a variation of the positioning of the magnet 38 changes either the width of a formed pulse or the number of steps in a count cycle in a manner which is apparent from the foregoing description of FIG. 2. Therefore, the device of FIG. 4 converts the analog or mechanical positioning of diaphragm 37 into a corresponding digital signal by changing the count cycle of the reactor.

Figure 5:
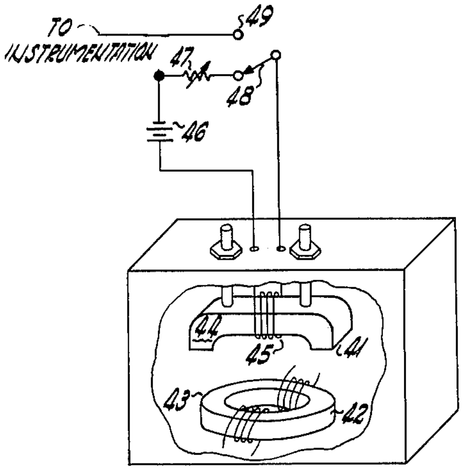
FIG. 5 is a diagrammatic view in perspective of a fourth embodiment of the invention which shows an electromagnet for pre-biasing a core.

In a fourth embodiment of the invention, an electromagnet is substituted for the permanent magnet (the term "magnet" being sometimes used herein to cover both electro-magnets and permanent magnets). Therefore, the amount of biasing flux field passing from the electromagnet 41 through core 42 which determines the width of the formed pulse or the number of steps in a count cycle is selected by changing the current flowing in the electro-magnet's coil. More particularly, as shown in FIG. 5 the saturable reactor 43 is positioned near the stationary electro-magnet 41 having a core 44 and a winding 45 energized from battery 46 via an adjustable potentiometer 47 and switch 48, in the position shown. Therefore, the amount of the magnet flux passing through the core is adjustably varied by varying the current flow in the winding 45. The magnetic effects which are thus produced are substantially the same as the effects produced by varying the position of the permanent magnet relative to the core, i.e., greater current flow through the winding causes more flux to pass from the magnet through the core. If switch 48 is thrown to contact 49, the winding 45 is energized by an analog current from any suitable instrumentation, thus providing a digital to analog converter. It should be understood that the electro-magnet may also be adjustably positionable like the permanent magnet mountings.

The conditions under which the saturable reactor must operate determines whether the permanent magnet or the electro-magnet is most advantageously used. The permanent magnet has uniform characteristics which are stable despite changes in temperature, humidity, and other environmental conditions. Moreover, a permanent magnet does not require a power source and does not produce unwanted side effects such as flux field variations caused by fluctuations in current, voltage or the like. The electro-magnet, on the other hand, provides a very easily controlled flux field. For example, the density of the field may be controlled from a remote point, or may be automatically controlled by a feed back signal to compensate for fluctuations in stray flux fields which pass through the core, or an analogue current applied to winding 45 may be converted to a digital signal output from a pulse counter. The variation of the electro-magnet current responsive to the variation of a condition in the apparatus of FIG. 5 is thus somewhat analogous to the positioning of the permanent magnet embodiment of FIG. 4.

In accordance with another feature of this invention, cascaded pulse former and counter stages may be controlled by varying the flux density of an external field passing through the core. If the core of the pulse former stage is biased toward saturation, output pulses produced during reset have a smaller volt-second content and a counter driven thereby must count a greater number of such reduced pulses before it produces an output signal, i.e. the count cycle is stretched over that of an unbiased core. On the other hand, if the core of the counter stage is biased toward magnetic saturation, the count cycle is shrunk over that of an unbiased core because the number of pulses which are required to saturate the counter core has been reduced.

Figure 6:
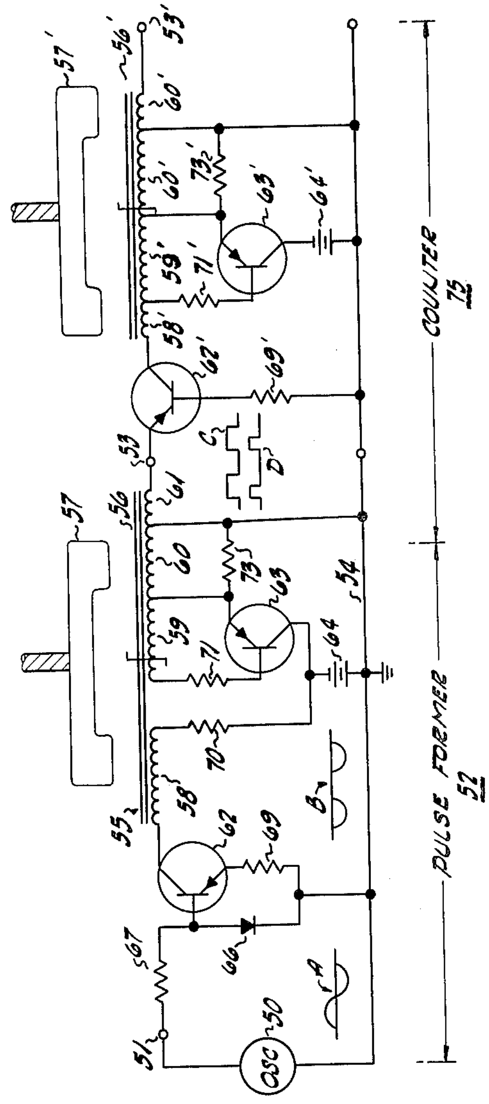
FIG. 6 is a circuit diagram of a pulse forming and counting circuit incorporating the invention.

Turning next to FIG. 6, there is shown a schematic circuit diagram of cascaded pulse former and counter stages which function in the described manner. More particularly, any suitable source 50 of a driving wave having alternate positive-and-negative-going half-cycles, as indicated in FIG. 6 by wave form A, is connected at input terminal 51 to drive a pulse former stage 52; however, it should be understood the cyclic source 50 may be replaced by a source of randomly occurring pulses. The pulse former stage also has an output terminal 53, both input and output terminals being referenced to a common or ground potential on bus 54. Another major element of the pulse former stage is a saturable reactor 55 having the core 56, and a permanent magnet 57 which may be constructed as shown in FIG. 1. While reference is here made to FIG. 1, it should be understood that any of other embodiments could be used. Wound on the core 56 are a saturating winding 58, a trigger winding 59, a reset winding 60 and an output winding 61. Between the source 50 and the saturating winding 58 is a gate circuit including transistor 62 which causes the flow of current in saturating winding 58 responsive to negative half-cycles in the driving wave. A switch circuit includes transistor 63 having its base electrode connected to the trigger winding 59 and its emitter-collector connected between a battery 64 and reset winding 60. Therefore, transistor 63 controls the flow of reset current responsive to the voltages induced in trigger winding 59 and applied to its base electrode. Both the gate and switch transistors are here shown by way of example as PNP junction type transistors.

Of the remaining components in the pulse former circuit, diode 66 is connected via current limiting resistor 67 between input terminal 51 and common bus 54 to shunt positive half-cycles of the driving wave to ground. An emitter bias is supplied to the transistor 62 from ground bus 54 through resistor 69. Resistor 70 is connected between one end of the saturating winding 58 and the battery 64, to limit current flow during saturation of the core. Resistor 71 is in the circuit between the base of transistor 63 and the trigger winding 59 to provide temperature compensation. A damping resistor 73 is in parallel with winding 60 to reduce transients which are produced responsive to the receipt of each drive pulse. Additional details about the construction and operation of devices similar to these, are given in the above identified Neitzert Patent 2,897,380.

Since a PNP transistor normally conducts only when its base is negative relative to its emitter, the negative half-cycles of wave form A trigger gate transistor 62 and current flows from ground bus 54 through resistor 69, the emitter-collector of transistor 62, saturating winding 58, and resistor 70 to battery 64, as indicated by wave form B. Without any magnetic pre-bias from magnet 57, the number of turns in the saturating winding 58 is sufficient to drive the core from a residual state of magnetization into and beyond the positive loop saturation level during each input pulse. Referring to the somewhat idealized hysteresis loop of the core (FIG. 7), the positive loop saturation level is indicated by the letter *a* and the elevated flux level that is reached during each drive pulse is indicated by the letter *b*. It is the decay of flux from point *b* to point *a* which triggers reset; whereupon, the flux level is driven back to negative remanence at point *c*.

Figure 9:
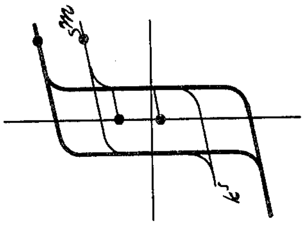
FIGS. 7–9 are plots of flux versus ampere turns which show the generally rectangular hysteresis loop of core materials employed in the saturable magnetic reactors of FIG. 6.
Figure 8:
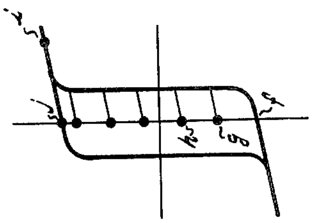
Figure 7:
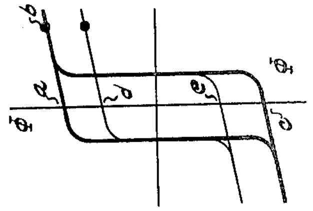

In the description which follows, it will be convenient to refer to the hysteresis loops of FIGS. 7–9 to show how the pre-bias of the flux field effects core flux. The hysteresis loop is a property of the core material, and therefore, never changes. The external flux field changes the effective area of the loop. Thus, without the biasing field, flux excursion is over the area inclosed by the heavily inked curves, and with the biasing field flux excursion is over the area inclosed by the lightly inked curves. However, it should be understood that these curves are drawn solely to illustrate how the effective loop area shrinks; the exact shape of this reduced area curve is not presently known.

Means are provided for selecting the width or volt-second content of a formed pulse by pre-biasing the core flux to an elevated level of saturation. More particularly, when the magnet 57 is moved toward core 56, the pre-biased level of magnetization may be any value (as indicated generally by the letters *d* and *e*) depending upon the amount of the magnet flux passing through the core, i.e. the position of the magnet relative to the core. Therefore, each time that a drive pulse occurs, the flux in core 56 is driven to and beyond a positive remanence (point *d*) following which the core flux decays to trigger reset. That is, during saturation, the base of switch transistor 63 is made more positive than the emitter thereof by a voltage induced in the control or trigger winding 59, hence, the transistor 63 is back biased and no current flows in the reset winding 60. When the negative half-cycle of wave form B terminates or falls below a predetermined value, current no longer flows in saturating winding 58 and the flux in core 56 decays, thus producing a flux change and a small voltage is induced in trigger winding 59. The base of switching transistor 63 goes negative relative to the emitter thereof and current flows from source 64 through reset winding 60 to ground bus 54, thereby driving core flux away from point *d* to the negative remanence level *e*, for example. During current flow through reset winding 60, output winding 61 acts as a secondary winding of a transformer (the primary winding being winding 60) so that an induced output pulse appears at terminal 53.

Since current flows in output winding 61 only during the time required to drive core flux from the positive remanence level to the negative remanence, the position of magnet 57 relative to the core controls the width of an output pulse. If magnet 57 is positioned so that the flux in the core must be driven from point *a* to point *c* during the reset cycle, current flows during a relatively long period of time and the output pulses generated in winding 61 are relatively wide as indicated by the wave form C (FIG. 6). On the other hand, if magnet 57 is positioned so that the flux in core 56 must be driven from point *d* to point *e* during the reset cycle, current flows during a short period of time and a relatively narrow output pulse is produced as indicated by curve D. The points *d–e* together with the proportions of wave forms C and D merely illustrate the principles of the invention. In actual practice, the density of the external flux field passing through core 56 may be varied over the entire range between points *a* and *c* so that the output signals appearing at terminal 53 have any preselected width or volt-second content.

In accordance with still another feature of this invention, the density of the external flux field controls the number of pulses in the count cycle of a magnetic counter. Again, the physical structure of the counter is here assumed to be that shown in FIG. 1; although, the invention is not limited thereto, the core flux of such a magnetic pulse counter is driven into the loop saturation level in a number of steps or increments of magnetization which is determined by the volt-second content of each input or drive pulse that is applied to energize the saturating winding; however, if the core is pre-biased by an external flux field, the counter is driven into saturation in a fewer number of steps. Stated another way, a count cycle may be shortened by increasing the density of the flux field passing through the core material.

The electrical portion of the counter is shown at 75 in FIG. 6. The parts of the counter which are similar to those of the pulse former stage 52 are indicated by the same reference numerals with a prime mark (′) added. Circuitry particularly fitting the requirements of multi-count counters as opposed to the one-count adjustment of the pulse former 52 is illustrated in FIG. 6 and follows the teachings of the previously mentioned Neitzert Patent 2,897,380.

Briefly, the gate transistor 62′ of the counter circuit is employed in an input circuit which does not amplify the pulses from the preceding stage but instead passes the positive-going pulses to ground through the series-connected windings 58′, 59′, and 60′ on core 56′. As shown, the emitter of a PNP transistor 62′ is connected to terminal 53, the collector is connected to the end of saturating winding 58′, and the base is connected through resistor 69′ to the ground or common bus 54. Negative-going pulses at terminal 53 are not transmitted since the negative pulse voltage renders the base of transistor 62′ positive with respect to its emitter. While the magnetization or positive saturation of the core 56′ is due to the combined turns of windings 58′, 59′ and 60′ rather than to winding 58′ alone, the turns of windings 59′ and 60′ are selected relative to each other to provide their respective control and reset functions as described in connection with windings 59 and 60 of pulse former stage 52. Upon decay of flux after the termination of the pulse which drives the core 56′ of the counter 75 past the loop positive saturation level, the reset circuit is triggered and resetting current flows from battery 64′ through reset winding 60′ and the emitter to collector terminals of reset transistor 63′. The dimensions of core 56′ and the total number of magnetizing turns is selected so that saturation of the core occurs after receipt of a selected number of pulses of a given size from the pulse former 52. For example, the number of turns in saturating winding 58′ may be selected so that the core 56′ is driven into saturation upon receipt of six pulses of given size C at terminal 53. As shown in FIG. 8, first input pulse drives the second from point *g* to *h*, etc., and the sixth pulse drives the flux from a level below the loop saturation level beyond point *j* and the knee of the curve to point *i*. As the sixth pulse decays, the accompanying core flux decay triggers the resetting action. The output pulse generated in reset winding 60′ by the resetting current as a volt-second content dependent upon the core characteristics and is independent of the voltage of the battery 64′.

To change the core characteristics and thus change the number of steps in a count cycle, the magnet 57′ is brought sufficiently close to core 56′ to pre-bias it and cause it to be saturated upon the completion of a lesser volt-second integration. The hysteresis loop of FIG. 8 is redrawn in FIG. 9 as a graphic illustration of the effect. Assuming a pre-biased negative level *k* in FIG. 9 beyond which the flux in core 56′ is not driven during resetting and a corresponding positive level *m* beyond which the flux is not driven during positive saturation, the cross-section area of the core is effectively diminished with respect to the unbiased core operating characteristics of FIG. 8. In this instance, with the magnet 57′ at an intermediate position, only three drive pulses are required to initiate resetting; i.e., the count is lowered from six to three. By moving the magnet 57′ sufficiently close to core 56′ the count may be as low as one, providing the magnet 57′ has sufficient strength. Any integral count below the maximum count may be thus programmed.

To provide more complete flexibility in the selection of the number of steps in a count cycle without changing the number of turns in a saturating winding, pulse formers and counter stages, each of which has its core traversed by flux of a selected amplitude from an external source, are cascaded as shown in FIG. 6. To increase or stretch the count cycle of the cascaded combination, magnet 57 is moved toward core 56 to reduce the volt-second content of output pulses appearing at terminal 53 for subsequent integration by the counter 56'. To decrease or shrink the count cycle, magnet 57' is moved closer to core 56' to reduce the number of steps required to drive it into and beyond magnetic saturation.

To better illustrate this relation, reference is made to an exemplary construction of the devices shown in FIG. 1. In this construction, the core is made of twenty-two wraps of "Orthonol," grain-oriented, rectilinear-hysteresis loop, magnetic material about .00025" thick and 1/8" wide. This material is spirally wound on a ceramic bobbin having an outside diameter of about 1/4". The external magnet shape and adjustment was that illustrated and described in connection with FIG. 1. In this exemplary device as used in the pulse former stage, the windings 12 include approximately one-hundred and fifteen turns which are distributed in the following manner: forty turns form a saturating winding, fifteen turns form a trigger winding, forty-eight turns form a reset winding and twelve turns form an output winding. In the device as used in the counter stage, the saturating winding is reduced to thirty turns and the trigger winding is reduced to ten turns. When this exemplary device was operated in the circuit of FIG. 6, it was found that without any magnetic prebias, a pulse appeared at output terminal 53' responsive to the receipt of each ten drive pulses at input terminal 51. That is, for pulses of dimensions formed by pulse former 52, the counter 75 had a count of ten. This count cycle of ten pulses was adjusted from ten to one by moving the counter magnet 57' closer to the core 56' or from ten to twenty by moving the pulse former magnet 57 closer to the core 56.

The output pulses at terminal 53' varied in volt-second dimensions only when the count of cascaded stages 52 and 75 was set below ten by varying the external flux through the core 56'. All the pulses at terminal 53' are readily equalized by supplying them to a succeeding pulse former stage. While the invention has been shown and described in connection with a simple one-stage counter driven by a pulse former, it should be understood that the principles disclosed herein may be used in connection with any number of cascaded stages driven from any desired source and that the example described by no means represents the limits available and range of variation.

I claim as my invention:

1. A magnetic device for forming or counting pulses comprising a saturable closed loop core having a substantially rectangular hysteresis loop and a source of flux field adjacent said core, means for varying the flux passing from the source through said core, means responsive to the receipt of at least one input pulse for driving said core from a first level of magnetization to a second level of magnetization, said first and second levels being selected by varying the amount of the source flux passing through said core, means responsive to said last named means for driving said core back to said first level of magnetization, and means effective during the time period required to drive said core from said second level back to said first level for producing an output signal.

2. A magnetic device for forming or counting pulses comprising a saturable closed loop core having a substantially rectangular hysteresis loop, an electro-magnet having an energizing winding and being positioned adjacent said core, means for varying the current flow through said winding for varying the amount of flux passing from the magnet through the core, means responsive to the receipt of at least one input pulse for driving said core from a first level of magnetization to a second level of magnetization, said first level and second level being selected by varying the current flow through the winding, means responsive to said last named means for driving said core back to said first level of magnetization, and means rendered effective during the time period required to drive said core from said second level back to said first level for producing an output signal.

3. A magnetic device for forming or counting electrical pulses comprising a closed annular core of rectanguler hysteresis loop material having at least one winding thereon for driving said core between two magnetic saturated states, a source of a flux field positioned near said core, the flux from said field entering the core at one point and traveling in parallel paths through said core to another point spaced away from said one point where the flux leaves the core, means responsive to energization of said winding for selectively generating either a clockwise or counterclockwise circular magnetic flux field in said core, the flux field in one of said parallel paths aiding said flux when generated in a first direction to drive said core to one of said magnetic saturated states, the flux field in the other said parallel paths aiding said flux when generated in a second direction to drive said core to the other of said magnetic saturated states, means responsive to the receipt of at least one drive pulse for energizing said winding to generate flux in said first direction to drive said core to said one state, means responsive to said last named means for triggering a reset cycle to generate flux in said second direction to drive said core to said other state, and means rendered effective during the time period required to drive said core to said other state for producing an output signal.

4. A magnetic pulse counting device comprising a saturable reactor closed core having a substantially rectangular hysteresis loop, means responsive to the receipt of input pulses for progressively driving said core from a first level of magnetic saturation to a second level of magnetic saturation in discrete increments of magnetization, each of said pulses increasing the magnetization of said core by a single increment, and means including a permanent magnet adjustably positionable relative to said core for magnetically biasing said core from said first level toward said second level of magnetic saturation thereby selecting the number of input pulses required to drive said core to said second level of saturation.

5. A magnetic device for forming or counting electrical pulses comprising a closed annular core of rectangular hysteresis loop material having at least one winding thereon for driving said core between two magnetic saturated states, a magnet positioned near said core with its pole pieces facing opposite sides of the core, the flux from said magnet entering the core at one point and traveling in parallel paths through said core to another point spaced away from said one point where the flux leaves the core, means responsive to energization of said winding for selective generating either a clockwise or a counterclockwise circular magnetic flux field in said core, the flux field in one of said parallel paths aiding said flux when generated in a first direction to drive said core to one of said magnetic saturated states, the flux field in the other of said parallel paths aiding said flux when generated in a second direction to drive said core to the other of said magnetic saturated states, whereby the amount of said generated flux required to drive said core between said saturated states is controlled by the amount of said magnet flux in said core, and means effective during the time required to drive said core to said other state for producing an output signal.

6. A magnetic device for forming or counting pulses comprising a saturable annular core having a substantially rectangular hysteresis loop and a magnet having opposite pole faces each separated by an air gap from spaced apart regions of the core length whereby the magnet flux passes through opposing core portions from one of said regions to the other, means for varying the amount of the flux passing from said magnet through said core, at least one winding on said core for generating flux which extends circularly around the core, means responsive to the receipt of at least one input pulse for energizing said winding to saturate a length of said core, one portion of said divided flux aiding said generated flux during said saturation of said length of core, means for reversing the direction of said generated flux to reset said core, the other portion of said divided flux aiding said reversed generated flux, and means responsive to said reset of said core for generating an output signal.

7. A magnetic device for forming or counting pulses comprising a saturable annular core having a rectangular hysteresis loop core, means including a rotatably mounted feed screw having a magnet secured to one of its ends for travel toward and away from said core responsive to rotation of feed screw, said magnet having opposite poles thereof facing diametrically opposed portions of the annular core, and at least one winding on said core for saturating and resetting said core.

8. In a magnetic analogue to digital converter, the combination comprising a saturable closed core having a substantially rectangular hysteresis loop, means responsive to the receipt of input pulses for progressively driving the flux of said core from a first level of magnetization to a second level of magnetization in discrete increments of magnetization, each of said pulses increasing the magnetization of said core by a single increment, means triggered by said core when its flux reaches said second level for producing an output signal, means including a magnet positioned adjacent said core for varying the amount of flux in said core as a variation of a condition, whereby the variation of said last named means determines the number of said pulses required to drive said core to said second level, and means responsive to the receipt of said number of pulses required to drive said core to said second level for producing an output pulse.

9. In a magnetic analogue to digital converter, the combination comprising a saturable closed core having a substantially rectangular hysteresis loop, means responsive to the receipt of input pulses for progressively driving said core from a first level of magnetization to a second level of magnetization in discrete increments, each of said pulses increasing the magnetization of said core by a single increment, means triggered by said core when driven to said second level for producing an output signal, a permanent magnet for biasing said core to said first level of magnetization, means mounted for physical movement as a function of the variation of a condition, and means responsive to said last named means for positioning said permanent magnet relative to said core to bias said core to said first level, whereby said physical movement determines the number of said pulses required to drive said core to said second level.

10. In a magnetic analogue to digital converter, the combination comprising a saturable closed core having a substantially rectangular hysteresis loop, means responsive to the receipt of input pulses for progressively driving said core from a first level of magnetization to a second level of magnetization in discrete increments, each of said pulses increasing the magnetization of said core by a single increment, means triggered by said core when driven to said second level for producing an output signal, and an electro-magnet having a winding for producing a flux field to bias said core to said first level of magnetization, said winding being energized by an analogue current which varies as a function of the variation of a condition for varying the density of the flux field passing through said core to magnetically bias said core in accordance with said condition, whereby said analogue current determines the number of said pulses required to drive said core to said second level.

11. A magnetic device for forming or counting pulses comprising a saturable annular closed core having a substantially rectangular hysteresis loop, a permanent magnet of predetermined strength, means positioning the permanent magnet relative to the core, the field of said permanent magnet pre-biasing said core to a selected level of magnetization, means responsive to the receipt of at least one input pulse for driving said core from said selected level of magnetization to a second level a magnetization, means triggered by said core when driven to at least said second level for resetting said core to said selected level of magnetization, and means effective throughout the time required to reset said core producing an output signal, whereby the field strength of said permanent magnet determines the width of said output signal.

12. In a device for forming and counting recurring input pulses each having a uniform volt-second content, the combination comprising at least one saturable magnetic reactor having a closed core made of a rectangular hysteresis loop material and a saturating winding associated therewith for driving said core to and beyond a saturation level of magnetization during at least one of said pulses, means including a magnet individually associated with said core for partially magnetizing a first portion of said core toward magnetic saturation of a first polarity and for partially magnetizing a second portion of said core toward magnetic saturation of an opposite polarity, the amount of said partial magnetizations being determined by the amount of magnet flux passing through said core, means responsive to decaying magnetic flux occurring at the end of said one pulse for driving said core from said saturation level of magnetization to an opposite saturation level of magnetization, and means responsive to said last named means for producing an output pulse to indicate receipt of said one pulse.

13. In a pulse forming and counting device, the combination comprising a source of recurring input pulses each having a uniform volt-second content, at least two saturable magnetic reactors each having an annular core made of rectangular hysteresis loop material and an associated winding, means including a source of a flux field individually associated with each of said cores for biasing the associated cores to preselected levels of magnetization, the winding associated with a first of said cores having a number of turns which is sufficient to drive said first core from a preselected level to which it is biased to and beyond a given level of magnetization during each of said recurring input pulses, means responsive to decaying magnetic flux occurring at the end of each of said input pulses for driving said first core from said given level to the preselected level to which said first core is biased, means responsive to said last named means for producing a first output pulse having a volt-second content determined by the preselected level to which said first core is biased, the winding associated with the other of said cores having a number of turns which is sufficient to drive said other core from the preselected level to which such other core is biased to and beyond a particular level responsive to a volt-second integration of a predetermined number of said first output pulses, and means triggered by said other core when driven to said particular level for producing a second output pulse thereby indicating the occurrence of a predetermined number of said input pulses.

14. A two stage magnetic counting device comprising a first stage including a pulse former having a substantially rectangular hysteresis loop magnetic closed core and at least one associated winding for driving said pulse former core to a given level of magnetization, means triggered by said pulse former core when driven to said given level for producing output pulses, means comprising a first source of flux field positioned near said pulse former core for preselecting the width of said output pulse, a second stage coupled to said first stage and including a pulse counter having a substantially rectangular hysteresis loop magnetic closed core and at least one associated winding for progressively driving said counter core to a particular level of magnetization in discrete increments of magnetization, the number of increments required to saturate said counter core varying as a function of the width of pulses applied to said counter winding, means comprising a second source of flux field positioned near said counter core for preselecting the volt-second integration of said output pulses required to drive said counter core to said particular level of magnetization, and means triggered by said counter core when driven to said particular level for producing an output signal whereby an adjustment of the effective density of said first flux field stretches the count cycle of said device and an adjustment of the effective density of said second flux field reduces said count cycle.

15. In an adjustable magnetic counting device for producing a uniform output pulse upon a given input pulse volt-second integration, the combination comprising a pulse forming stage including a first magnetic closed core having substantially rectangular hysteresis loop characteristics, means comprising a first permanent magnet for adjustably pre-biasing said first core to a selected level of magnetization, means responsive to recurring drive pulses for driving said first core from said selected level of magnetization into a second level of magnetization, means triggered by said first core when driven to said second level for resetting said first core to said selected level of magnetization, means responsive to said last named means for producing an output pulse the width of which is controlled by the time required to reset said first core to said selected level; and a pulse counting stage coupled to said pulse forming stage including a second magnetic closed core having substantially rectangular hysteresis loop characteristics, means comprising a second permanent magnet for adjustably pre-biasing said second core to be driven to a given level of magnetization responsive to an integration of a number of said output pulses, means responsive to the integration of said number of said output pulses for driving said second core to said given level, and means responsive to said last named means for producing an output signal to indicate the receipt of a predetermined number of said drive pulses.

16. A two stage magnetic counting device comprising a first stage including a pulse former having a substantially rectangular hysteresis loop closed magnetic core and at least one associated winding for driving said pulse former core to a given level of magnetization, means triggered by said pulse former core when driven to said given level for producing output pulses, means comprising a first source of flux field including an electro-magnet positioned near said pulse former core for preselecting the width of said output pulse, a second stage coupled to said first stage and including a pulse counter having a substantially rectangular hysteresis loop closed magnetic core and at least one associated winding for progressively driving said counter core to a particular level of magnetization in discrete increments of magnetization, the number of increments required to saturate said counter core varying as a function of the width of pulses applied to said counter winding, means comprising a second source of flux field including an electro-magnet positioned near said counter core for preselecting the volt-second integration of said output pulses required to drive said counter core to said particular level of magnetization, and means triggered by said counter core when driven to said particular level for producing an output signal whereby an adjustment of the effective density of said first flux field stretches the count cycle of said device and an adjustment of the effective density of said second flux field reduces said count cycle.

17. A two stage magnetic counting device comprising a first stage including a pulse former having a substantially rectangular hysteresis loop closed core and at least one associated winding, means comprising a first source of flux field positioned near said pulse former core for magnetically biasing a first segment of said pulse former core toward positive saturation and for magnetically biasing a second segment of said pulse former core toward negative saturation, means for driving said first segment of said pulse former core to a given level of magnetization responsive to each in a series of drive pulses, means triggered by flux change when said first segment of said pulse former core is driven to said given level for producing an output pulse and for driving said second segment of said pulse former core to an opposite level of magnetization, said output pulse being terminated when said second segment reaches said opposite level, a second stage coupled to said first stage and including a pulse counter having a rectangular hysteresis loop closed core and at least one associated winding, means comprising a second source of flux field positioned near said counter core for magnetically biasing a first segment of said counter core toward positive saturation and for magnetically biasing a second segment of said counter core toward negative saturation, means progressively driving said first segment of said counter core to a particular level of magnetization in discrete increments of magnetization, the number of increments required to saturate said counter core varying as a function of the width of pulses applied to said counter winding, and means triggered by flux change when said first segment of said counter core is driven to said particular level for producing an output signal and for driving said second segment of said counter core to an opposite level of magnetization whereby an adjustment of the effective density of said first flux field stretches the count cycle of said device and an adjustment of the effective density of said second flux field shrinks said count cycle.

References Cited by the Examiner

UNITED STATES PATENTS

| | | | |
|---|---|---|---|
| 2,741,757 | 4/1956 | Devol et al. | 340—174 |
| 2,781,503 | 2/1957 | Saunders | 340—174 |
| 2,897,380 | 7/1959 | Neitzert | 307—88 |
| 3,075,084 | 1/1963 | De Miranda et al. | 307—88 |

IRVING L. SRAGOW, *Primary Examiner.*